United States Patent
Lin et al.

(10) Patent No.: US 11,237,464 B2
(45) Date of Patent: Feb. 1, 2022

(54) PROJECTOR AND LENS MODULE

(71) Applicant: Coretronic Corporation, Hsin-Chu (TW)

(72) Inventors: Shu-Yu Lin, Hsin-Chu (TW); Tsan-Fu Tseng, Hsin-Chu (TW); Ming-Chen Liu, Hsin-Chu (TW); Mao-Jen Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 658 days.

(21) Appl. No.: 16/172,688

(22) Filed: Oct. 26, 2018

(65) Prior Publication Data

US 2019/0129286 A1    May 2, 2019

(30) Foreign Application Priority Data

Oct. 31, 2017 (CN) .......................... 201711048517.8

(51) Int. Cl.
| | |
|---|---|
| *G02B 21/14* | (2006.01) |
| *G02B 7/02* | (2021.01) |
| *G02B 7/10* | (2021.01) |
| *G02B 27/09* | (2006.01) |
| *G03B 21/14* | (2006.01) |

(52) U.S. Cl.
CPC ........... *G03B 21/142* (2013.01); *G02B 7/023* (2013.01); *G02B 7/10* (2013.01); *G02B 27/0955* (2013.01); *G03B 21/145* (2013.01)

(58) Field of Classification Search
CPC ..... G03B 21/00–64; H04N 9/31–3197; G09G 3/007
See application file for complete search history.

(56) References Cited

U.S. PATENT DOCUMENTS

| | | |
|---|---|---|
| 7,055,971 B2 | 6/2006 | Gishi |
| 7,164,546 B2 | 1/2007 | Miyashita et al. |
| 2004/0057723 A1 | 3/2004 | Uenaka et al. |
| 2004/0114115 A1 | 6/2004 | Runco |
| 2009/0040479 A1 | 2/2009 | Liao et al. |

(Continued)

FOREIGN PATENT DOCUMENTS

| | | |
|---|---|---|
| CN | 1353320 A | 6/2002 |
| CN | 101290462 A | 10/2008 |

(Continued)

*Primary Examiner* — Michelle M Iacoletti
*Assistant Examiner* — Christopher A Lamb, II

(57) ABSTRACT

The invention discloses a projector, including a light source, a light engine module and a lens module. The lens module includes a plate, a lens, at least two sliding components and a first position adjustment device. The sliding components are disposed between the plate and a light engine housing and located respectively at a first position and a second position of the light engine housing. Each of the sliding components has a sliding member and a distance adjustment member. The plate is movably disposed on the light engine housing via the sliding member. The distance adjustment members are in contact with the sliding members respectively. The first position adjustment device is movably disposed between the plate and the light engine housing. The invention further discloses a lens module. The invention can improve movement accuracy and imaging stability of a projector and a lens module.

30 Claims, 9 Drawing Sheets

(56) References Cited

U.S. PATENT DOCUMENTS

| | | |
|---|---|---|
| 2010/0045945 A1 | 2/2010 | Tseng |
| 2011/0090578 A1 | 4/2011 | Yoshimura |
| 2017/0010522 A1* | 1/2017 | Shen .................... G03B 21/145 |

FOREIGN PATENT DOCUMENTS

| | | |
|---|---|---|
| CN | 101398520 A | 4/2009 |
| CN | 102004294 A | 4/2011 |
| CN | 104407487 A | 3/2015 |
| CN | 104678528 A | 6/2015 |
| CN | 106324960 A | 1/2017 |
| JP | H02111175 A | 4/1990 |
| JP | 2006301424 A | 11/2006 |
| JP | 2007025724 A | 2/2007 |
| JP | 2017129711 A | 7/2017 |
| TW | M352059 U | 3/2009 |
| TW | 201030445 A1 | 8/2010 |

* cited by examiner

PROJECTOR AND LENS MODULE

CROSS-REFERENCE TO RELATED APPLICATION

This application claims the priority benefit of china application (CN201711048517.8 filed on 2017 Oct. 31). The entirety of the above-mentioned patent application is hereby incorporated by reference herein and made a part of this specification.

FIELD OF THE INVENTION

The invention involves a projector, and more particularly involves a projector having a movable lens module.

BACKGROUND OF THE INVENTION

A projector uses a movable lens module to move a lens in horizontal and vertical directions, so as to project an image beam onto a desired area of a screen or a wall. The movable lens module is structurally formed by sequentially assembling a fixture base, a vertical plate and a horizontal plate. The lens is assembled onto the horizontal plate or the vertical plate. In principle, the movable lens module is actuated to move in a horizontal direction by moving the horizontal plate and to move in a vertical direction by moving the vertical plate.

Since the current movable lens modules are designed to employ two movable plates for vertical movement and horizontal movement, the cost, complexity in structure, difficulty in production and other problems are significant. In addition, the two moving plates are difficult to be controlled to be highly parallel, and the movement accuracy and imaging stability of the lens are compromised as a result.

The description disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more of the problems to be solved by one or more embodiments of the invention were acknowledged by a person of ordinary skill in the art.

SUMMARY OF THE INVENTION

An objective of the invention is to provide a projector, comprising a light source, a light engine module, and a lens module. The lens module has a position adjustment device and a sliding component, and may improve movement accuracy and imaging stability of the lens module. The structure is simple and the cost of the parts is substantially reduced.

A further objective of the invention is to provide a lens module having a position adjustment device and a sliding component, which may be used to improve movement accuracy and imaging stability of the lens module. The structure is simple and the cost of the parts is substantially reduced.

Other objectives and advantages of the invention can be further understood from the technical features disclosed in the invention.

In order to achieve one or a portion of or all of the objectives or other objectives, the invention provides a projector, comprising a light source, a light engine module, and a lens module. The light source is used to provide an illumination beam. The light engine module includes a light engine housing and a light valve. The light valve is accommodated in the light engine housing and used to convert the illumination beam into an image beam. The lens module is located on a transmission path of the image beam and includes a plate, a lens, at least two sliding components, and a first position adjustment device. The lens is fixed to the plate. The image beam becomes a projection beam after passing through the lens. The sliding components are disposed between the plate and the light engine housing and are at least located at a first position and a second position of the light engine housing. Each of the sliding components has a sliding member and a distance adjustment member. The plate is movably disposed on the light engine housing via the sliding members. The distance adjustment members are in contact with the sliding members, respectively, so that a distance between the first position and the lens module is equal to a distance between the second position and the lens module. The first position adjustment device is movably disposed between the plate and the light engine housing and is configured to move in a first axial direction when applied a force, so as to drive the plate to move on the sliding components in the first axial direction and with respect to the light engine housing.

In order to achieve one or a portion of or all of the objectives or other objectives, the invention further provides a lens module for a projector. The lens module includes a plate, a lens, at least two sliding components, and a first position adjustment device. The lens is fixed to the plate. The sliding components are disposed between the plate and a light engine housing of the projector, and are located at least at a first position and a second position of the light engine housing. Each of the sliding components has a sliding member and a distance adjustment member. The plate is movably disposed on the light engine housing via the sliding members. The distance adjustment members are in contact with the sliding members, respectively, so that a distance between the first position and the lens module is equal to a distance between the second position and the lens module. The first position adjustment device is movably disposed between the plate and the light engine housing and is configured to move in a first axial direction when applied a force, so as to drive the plate to move on the sliding components in the first axial direction and with respect to the light engine housing.

In the projector of an embodiment of the invention, the lens module can be moved in two directions (for example, a horizontal direction and/or a vertical direction) by using the position adjustment device. With the distance between the light engine housing and the plate being adjusted by using the various distance adjustment members of the sliding components, the light engine housing and the plate are prevented from inclining to each other, and the positional relationship between the lens fixed onto the plate and the light valve located in the light engine housing is thereby well controlled. The movement accuracy and the imaging stability of the lens module are improved, so as to ensure that the projected screen is not blurred. The imaging resolution is thereby enhanced. In addition, in the embodiment of the invention, since the sliding component is disposed between the light engine housing and the plate, there is no direct contact between the plate and the light engine housing. As a result, when the lens module moves, the plate of the lens module and the light engine housing may not be damaged due to friction.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
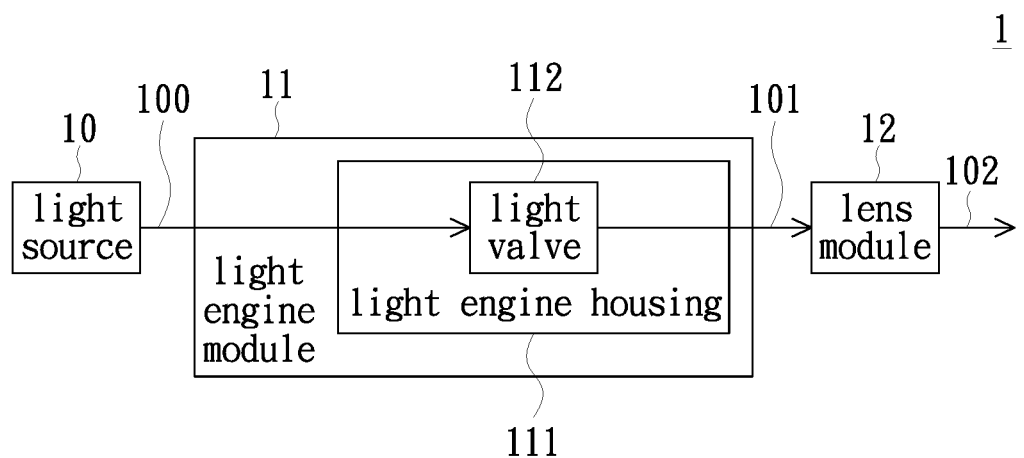
FIG. 1 is a functional block diagram of a projector of an embodiment of the invention.

FIG. 1 is a functional block diagram of a projector of an embodiment of the invention. As shown in FIG. 1, the projector 1 of the embodiment includes a light source 10, a light engine module 11, and a lens module 12. The light source 10 is used to provide an illumination beam 100. The light engine module 11 includes a light engine housing 111 and a light valve 112. The light valve 112 is accommodated in the light engine housing 111 and is used to convert the illumination beam 100 into an image beam 101. In the embodiment, the light valve 112 is fixed in the light engine housing 111. In the embodiment, the light valve 112 may be a digital micro-mirror device (DMD), a liquid crystal on silicon (LCoS), or a liquid crystal display (LCD) panel, but the invention is not limited thereto. The lens module 12 is located on a transmission path of the image beam 101. The image beam 101 of the embodiment becomes a projection beam 102 after passing through a lens (described later) of the lens module 12.

In the embodiment, two sliding components (described later) may be disposed at two positions of the light engine housing 111 (for example, a first position and a second position), so that a distance between the first position of the light engine housing 111 and the lens module 12 is equal to a distance between the second position of the light engine housing 111 and the lens module 12. As such, in the embodiment, distances between each position of the light engine housing 111 and the lens module 12 can be configured to be equal by the configuration of at least two sliding components. That is, the light engine housing 111 and the lens module 12 do not incline to each other, thus the imaging quality of the lens module 12 is improved. Hereinafter, the detailed structures of the lens module 12 and the light engine module 11 shown in FIG. 1 and the embodiments thereof are further described.

Figure 2:
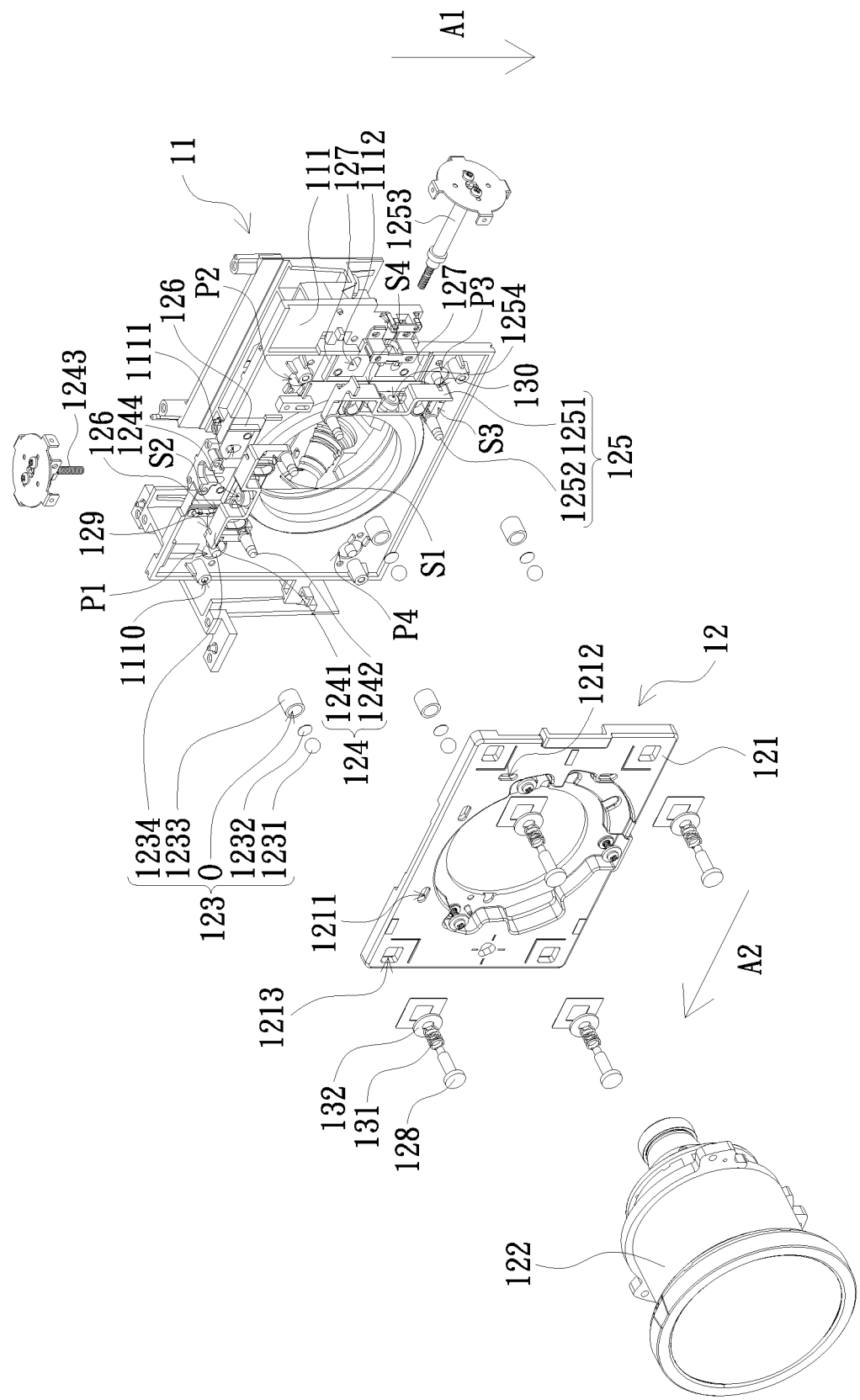
FIG. 2 is a schematically exploded view of a light engine module and a lens module of the embodiment.
Figure 3:
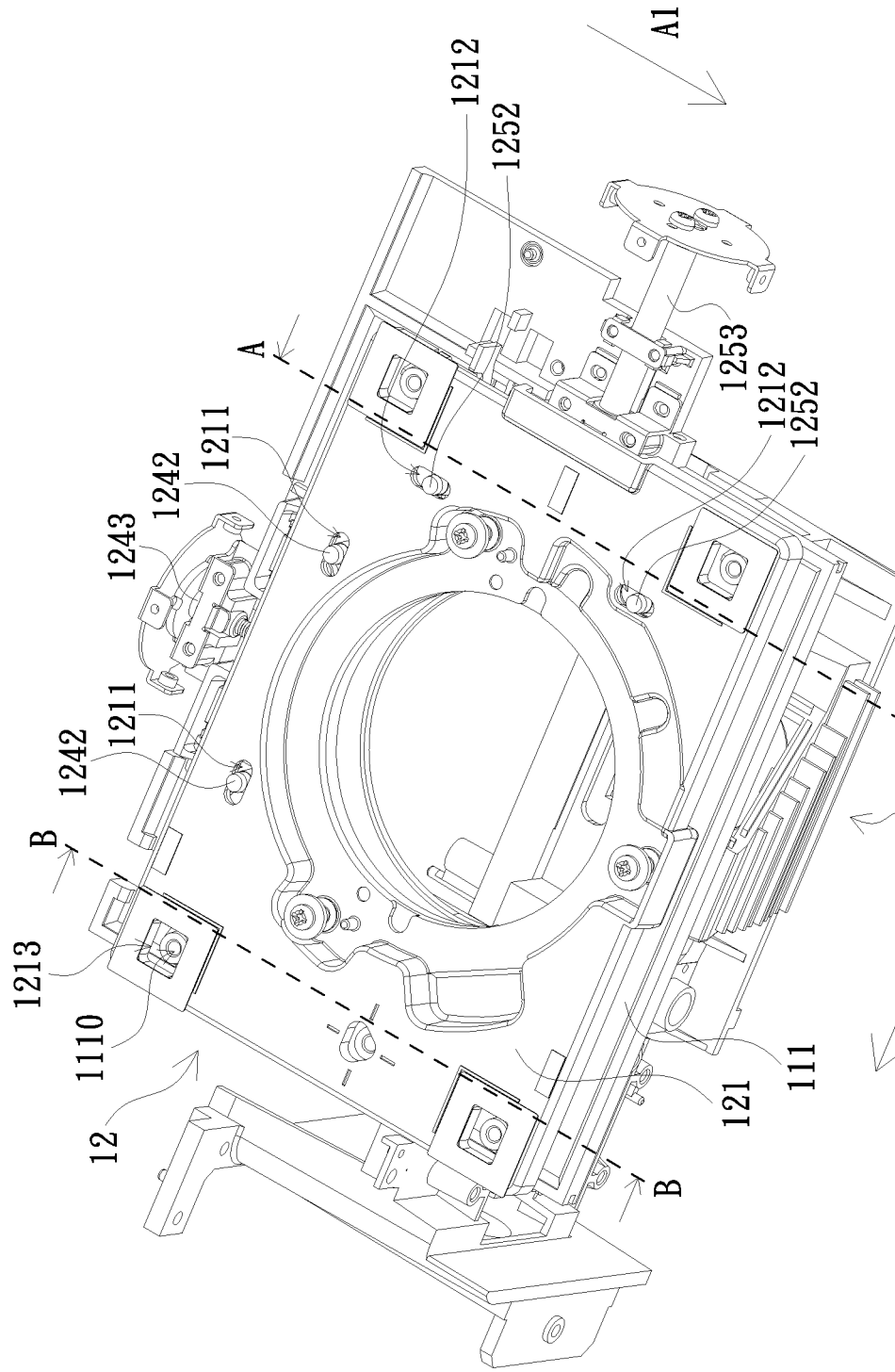
FIG. 3 is a schematically assembled view of the light engine module and the lens module shown in FIG. 2.
Figure 4:
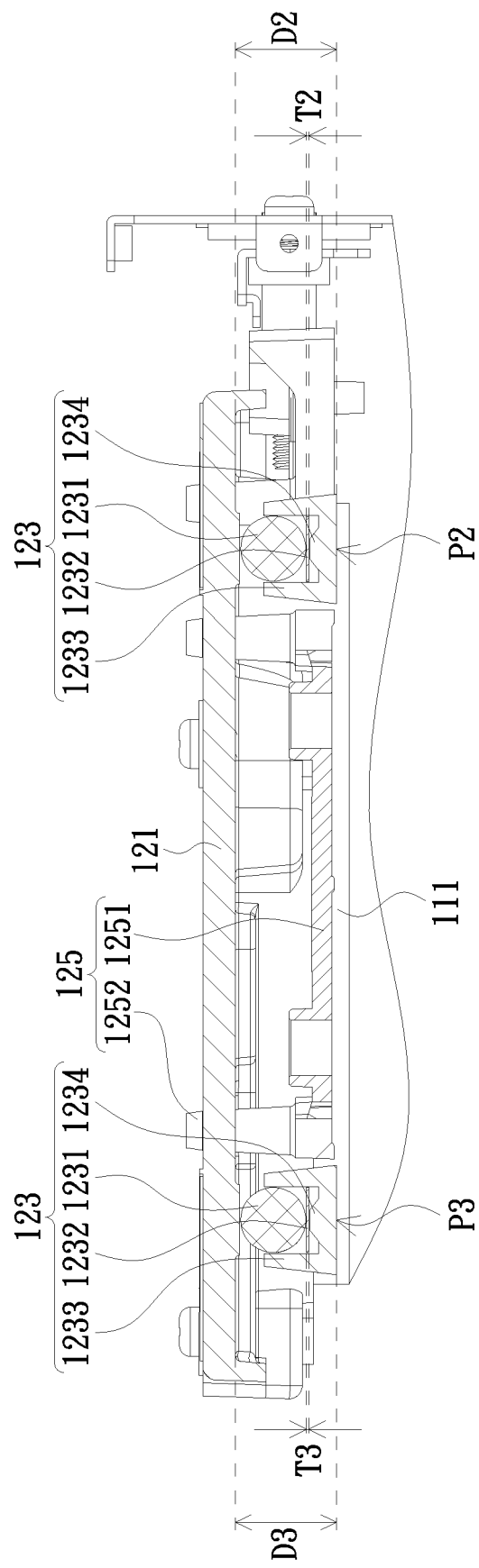
FIG. 4 is a schematic cross-sectional view cut along the line A-A shown in FIG. 3.
Figure 5:
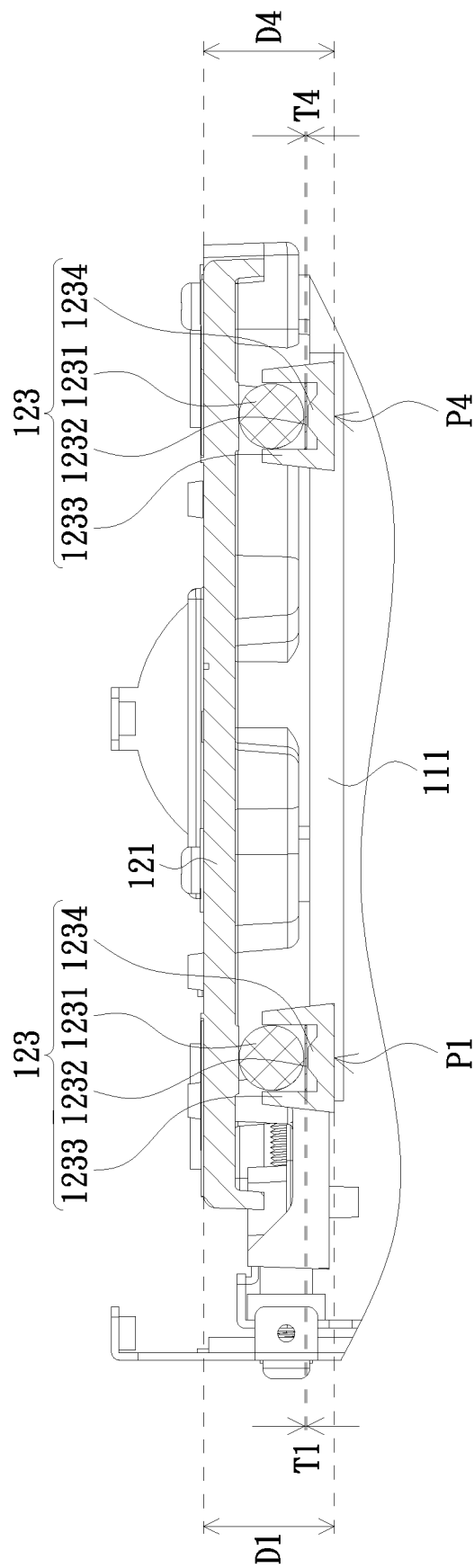
FIG. 5 is a schematic cross-sectional view cut along the line B-B shown in FIG. 3.

FIG. 2 is a schematically exploded view of the light engine module and the lens module of the embodiment. FIG. 3 is a schematically assembled view of the light engine module and the lens module shown in FIG. 2. FIG. 4 is a schematic cross-sectional view cut along the line A-A shown in FIG. 3. FIG. 5 is a schematic cross-sectional view cut along the line B-B shown in FIG. 3. As shown in FIG. 2 to FIG. 5, the lens module 12 of the embodiment includes a plate 121, a lens 122, at least two sliding components 123, and a first position adjustment device 124. In the embodiment, the lens 122 is fixed to the plate 121. The sliding components 123 are disposed between the plate 121 and the light engine housing 111. In the embodiment, the number of the sliding components 123 is, for example, four. However, the invention does not limit the number of the sliding components provided that at least two sliding components 123 are disposed. In the embodiment, the sliding components 123 are, for example, located at a first position P1, a second position P2, a third position P3 and a fourth position P4 of the light engine housing 111, respectively. In the embodiment, the sliding components 123 are, for example, located at four corners of the light engine housing 111 respectively, but the invention does not limit the positions of the sliding components. In the embodiment, each of the sliding components 123 has a sliding member 1231 and a distance adjustment member 1232. The plate 121 is movably disposed on the light engine housing 111 via the sliding members 1231. In the embodiment, the distance adjustment members 1232 are in contact with the sliding members 1231 respectively, so that a distance D1 between the first position P1 and the plate 121, a distance D2 between the second position P2 and the plate 121, a distance D3 between the third position P3 and the plate 121, and a distance D4 between the fourth position P4 and the plate 121 are equal to one another. In the embodiment, the first position adjustment device 124 is movably disposed between the plate 121 and the light engine housing 111 and is configured to move in a first axial direction A1 when applied a force, so as to drive the plate 121 to move on the sliding components 123 in the first axial direction A1 and with respect to the light engine housing 111.

As each of the sliding components 123 of the embodiments of FIG. 2 to FIG. 5 shown, the distance adjustment member 1232 is located between the light engine housing 111 and a corresponding sliding member 1231. That is, the sliding member 1231 is located between the plate 121 and a corresponding distance adjustment member 1232. Each of the sliding components 123 further includes a base 1233 and a boss 1234. However, the invention is not limited thereto. In the embodiment, the base 1233 is disposed between the plate 121 and the light engine housing 111. The base 1233 has an opening O facing the plate 121. In the embodiment, the distance adjustment member 1232 is located in the base 1233. The sliding member 1231 is disposed at the base 1233. A part of the sliding member 1231 extends out of the opening O of the base 1233. In the embodiment, the part of the sliding member 1231 that extends out of the opening O is in contact with the plate 121, so that the plate 121 can move relatively to the light engine housing 111 via the sliding members 1231. To put it simply, the plate 121 is movably disposed on the light engine housing 111 with the configuration that the sliding components 123 are in contact with the plate 121 and that the sliding components 123 move relatively to the light engine housing 111. In the embodiment, the boss 1234 is disposed in the base 1233 and the distance adjustment member 1232 is located between the boss 1234 and the sliding member 1231. In the embodiment, each of the sliding members 1231 is, for example, a spheroid-shaped metal ball. Each of the distance adjustment members 1232 is, for example, a metal washer. However, the shape, type and material of each of the sliding members and each of the distance adjustment members are not limited in this invention. In the embodiment, the base 1233 of the sliding component 123 is, for example, separated from the light engine housing 111. However, the invention is not limited thereto. However, in an embodiment, the base 1233 of the sliding component 123 is directly connected to the light engine housing 111. In other embodiments, the base 1233 of the sliding component 123 and the light engine housing 111 are, for example, integrally formed in structure. However, the invention is not limited thereto.

As shown in FIG. 2 to FIG. 5, in the embodiments, a distance between the light engine housing 111 and the plate 121 can be adjusted by the distance adjustment members 1232 of the sliding components 123, so that the light engine housing 111 and the plate 121 do not incline to each other, and the positional relationship between the lens 122 fixed onto the plate 121 and the light valve 112 fixed in the light engine housing 111 is thereby well controlled. Thus, the relative positions of the lens 122 and the light valve 112 can be improved in accuracy, so as to ensure that the projected screen is not blurred. In detail, in the embodiment, the distance adjustment members 1232 of the sliding components 123 are extended from the light engine housing 111 toward the plate 121 and have thicknesses T1, T2, T3, and T4, respectively. In the embodiment, the distance D1 between the first position P1 of the light engine housing 111 and the plate 121, the distance D2 between the second position P2 of the light engine housing 111 and the plate 121, the distance D3 between the third position P3 of the light engine housing 111 and the plate 121, and the distance D4 between the fourth position P4 of the light engine housing 111 and the plate 121 are adjusted via the distance adjustment members 1232 of various thicknesses, so that the distances D1, D2, D3, and D4 can be equal to one another. In the embodiment, the first position P1, the second position P2, the third position P3, and the fourth position P4 are, for example, located at four corners of the light engine housing 111, respectively. When the distances D1, D2, D3, and D4 are equal to one another, the plate 121 and the light engine housing 111 are approximately parallel to each other, so that the plate 121 and the light engine housing 111 do not incline to each other. Thus, the relative positions of the lens 122 and the light valve 112 can be improved in accuracy. In the embodiment, in the case where the distances D1, D2, D3 and D4 can be equal to one another, the thicknesses T1, T2, T3, and T4 of the distance adjustment members 1232 may be the same as one another, different from one another, or some of them the same while some of them different from one another. That is, in order to achieve the equal distances D1, D2, D3, and D4, the invention does not limit the various values of the thicknesses T1, T2, T3, and T4.

Figure 6A:
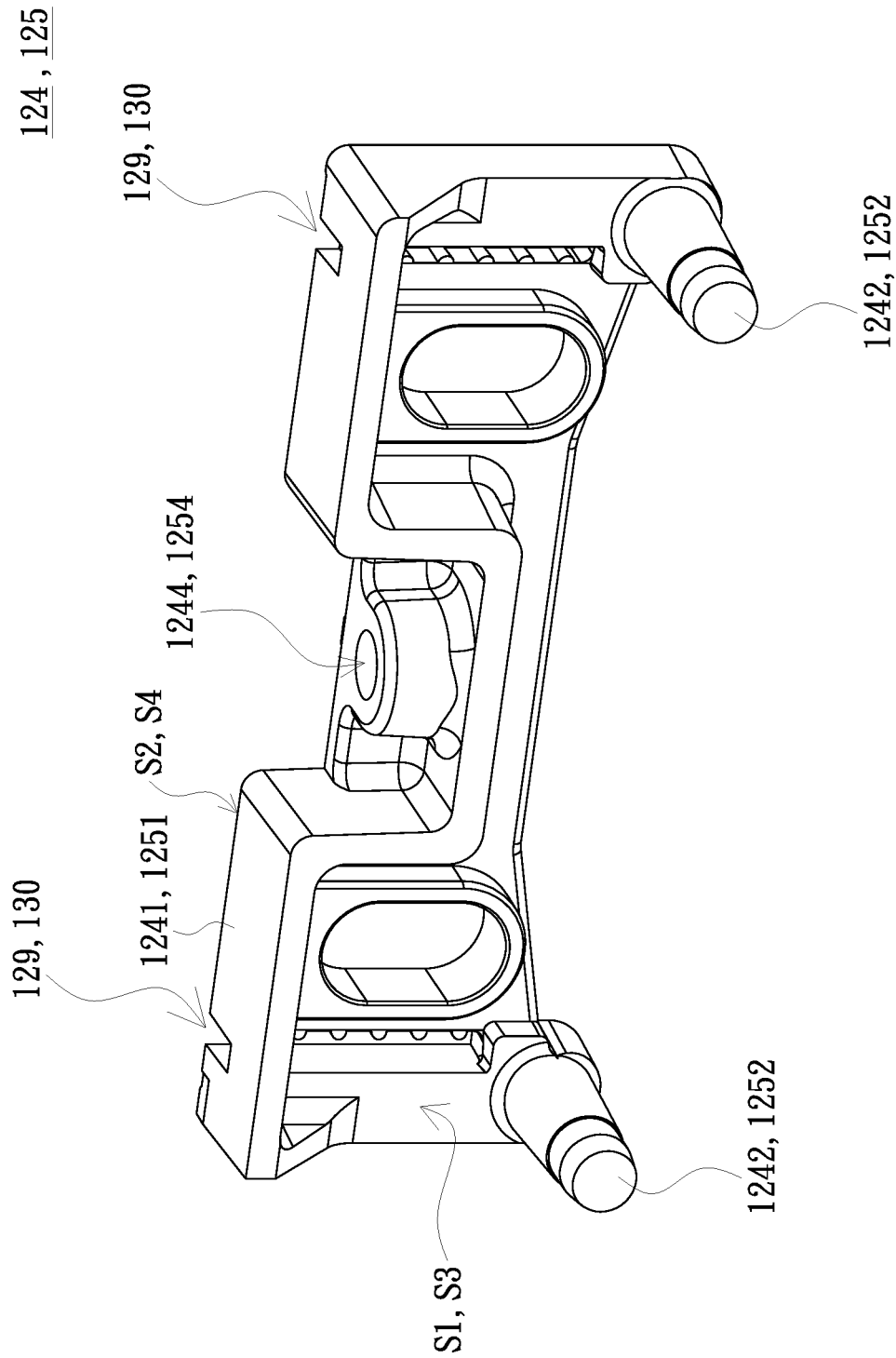
FIG. 6A is a schematic exterior structural view of a position adjustment device shown in FIG. 2.
Figure 6B:
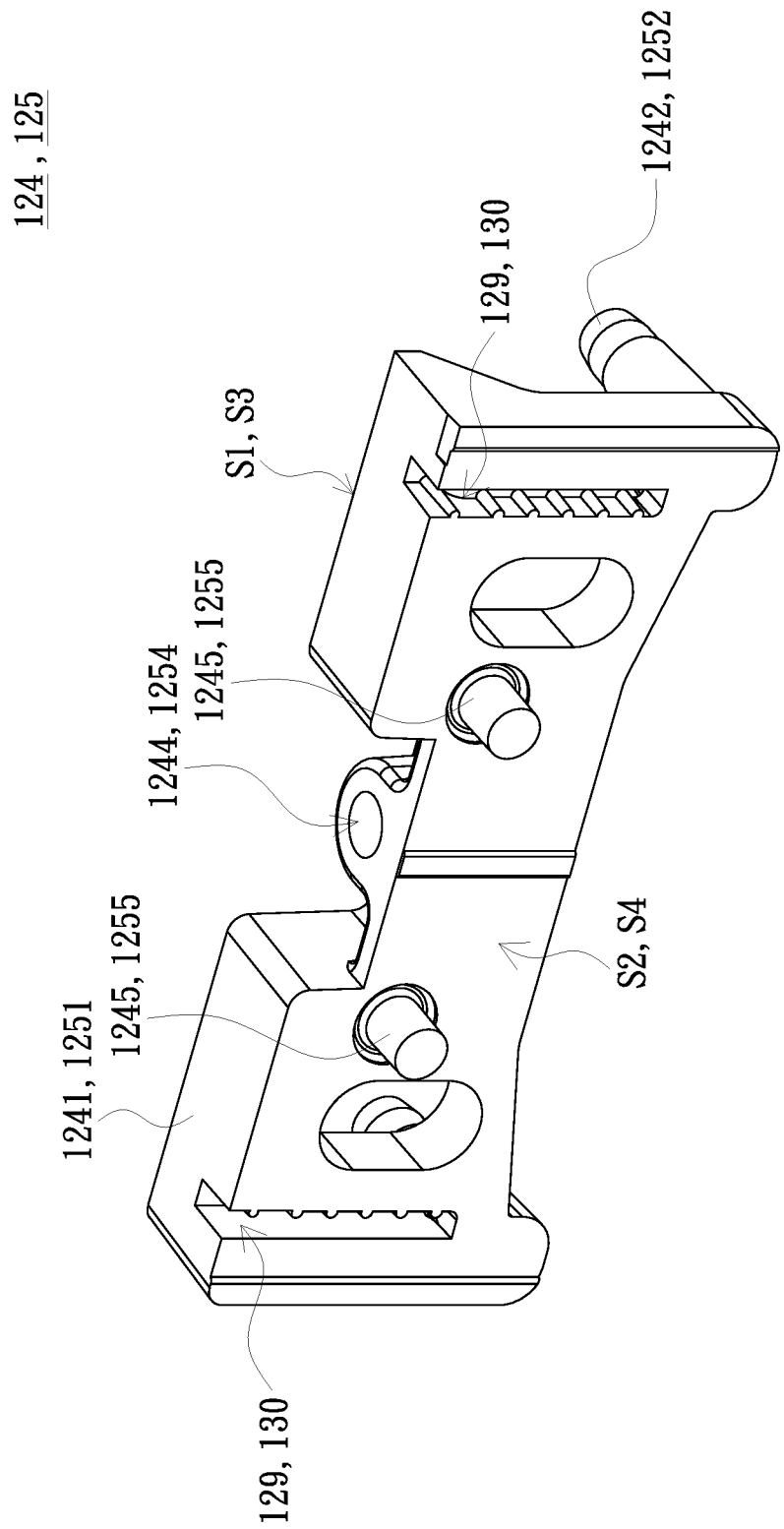
FIG. 6B is a schematic exterior structural view of a position adjustment device shown in FIG. 6A from another viewing angle.

FIG. 6A is a schematic exterior structural view of a position adjustment device shown in FIG. 2. FIG. 6B is a schematic exterior structural view of a position adjustment device shown in FIG. 6A from another viewing angle. As shown in FIG. 2 to FIG. 6B, in the embodiments, the plate 121 has at least one first through hole 1211. The first position adjustment device 124 includes a first movable guiding member 1241 and at least one first guiding column 1242. In the embodiment, the first movable guiding member 1241 is movably disposed between the plate 121 and the light engine housing 111. The first guiding column 1242 is disposed at the first movable guiding member 1241 and is extended in a direction toward the plate 121 to pass through the first through hole 1211 of the plate 121. In the embodiment, when the first movable guiding member 1241 is driven (for example, pushed) to move toward the first axial direction A1, the first guiding column 1242 can drive the plate 121 to move on the sliding component 123 along the first axial direction A1 and with respect to the light engine housing 111. The various detailed embodiments about driving the first movable guiding member 1241 are further described below.

As shown in FIG. 2 to FIG. 6B, the first position adjustment device 124 of the embodiment further includes a first adjustment member 1243. In the embodiment, the first adjustment member 1243 is located at one side of the first movable guiding member 1241. Specifically, in the embodiment, the first adjustment member 1243 is coupled to the first movable guiding member 1241 via connecting into a connection hole 1244 of the first movable guiding member 1241. In the embodiment, the first adjustment member 1243 is used to drive (for example, pushing) the first movable guiding member 1241 to move in the first axial direction A1, so that the first guiding column 1242 drives the plate 121 to move on the sliding component 123 along the first axial direction A1 and with respect to the light engine housing 111. Specifically, in the embodiment, the first through hole 1211 is extended along a second axial direction A2 that is approximately perpendicular to the first axial direction A1. However, the invention is not limited thereto. In the embodiment, when the first adjustment member 1243 drives (for example, pushes) the first movable guiding member 1241 to move toward the first axial direction A1, the first guiding column 1242 drives the plate 121 to move toward the first axial direction A1 via abutting against an inner wall of the first through hole 1211. In the embodiment, the first adjustment member 1243 is, for example, a knob extended outside the housing of the projector 1. The user rotates, for example, the first adjustment member 1243 (a knob) such that the first adjustment member 1243 drives (for example, pushes) the first movable guiding member 1241 to move toward the first axial direction A1. However, the invention is not limited thereto.

As shown in FIG. 2 to FIG. 6B, the plate 121 of the embodiment further has at least one second through hole 1212. In the embodiment, the second through hole 1212 is, for example, extended along the first axial direction A1. However, the invention is not limited thereto. The lens module 12 of the embodiment further includes a second position adjustment device 125. Since the structures of the first position adjustment device 124 and the second position adjustment device 125 of the embodiment are approximately identical, to simplify the description, both the first position adjustment device 124 and the second position adjustment device 125 are illustrated in FIG. 6A and FIG. 6B. In the embodiment, the second position adjustment device 125 includes a second movable guiding member 1251 and at least one second guiding column 1252. In the embodiment, the second movable guiding member 1251 is movably disposed between the plate 121 and the light engine housing 111. The second guiding column 1252 is disposed at the second movable guiding member 1251 and is extended toward the plate 121 so as to pass through the second through hole 1212. In the embodiment, when the second movable guiding member 1251 is driven (for example, pushed) to move toward the second axial direction A2 that is approximately perpendicular to the first axial direction A1, the second guiding column 1252 can drive the plate 121 to move on the sliding component 123 along the second axial direction A2 and with respect to the light engine housing 111. From the above, in various embodiments, the second position adjustment device 125 is movably disposed between the plate 121 and the light engine housing 111 and is configured to move in the second axial direction A2 when applied a force, so as to drive the plate 121 to move on the sliding components 123 along the second axial direction A2 and with respect to the light engine housing 111. In this way, with the first position adjustment device 124 and the second position adjustment device 125 movably disposed between the plate 121 and the light engine housing 111, the plate 121 can move along the first axial direction A1 and the second axial direction A2 with respect to the light engine housing 111, so as to move in at least two directions (for example, a horizontal direction and/or a vertical direction). The various detailed embodiments about driving the second movable guiding member 1251 are further described below.

As shown in FIG. 2 to FIG. 6B, the second position adjustment device 125 of the embodiment further includes a second adjustment member 1253. In the embodiment, the second adjustment member 1253 is located at one side of the second movable guiding member 1251. Specifically, in the embodiment, the second adjustment member 1253 is coupled to the second movable guiding member 1251 via connecting to a connection hole 1254 of the second movable guiding member 1251. In the embodiment, the second adjustment member 1253 is used to drive (for example, pushing) the second movable guiding member 1251 to move in the second axial direction A2, so that the second guiding column 1252 drives the plate 121 to move on the sliding component 123 along the second axial direction A2 and with respect to the light engine housing 111. Specifically, in the embodiment, when the second adjustment member 1253 drives (for example, pushes) the second movable guiding member 1251 to move toward the second axial direction A2, the second guiding column 1252 drives the plate 121 to move toward the second axial direction A2 via abutting against an inner wall of the second through hole 1212. In the embodiment, the second adjustment member 1253 is, for example, a knob extended outside the housing of the projector 1. The user rotates, for example, the second adjustment member 1253 (a knob) such that the second adjustment member 1253 drives (for example, pushes) the second movable guiding member 1251 to move in the second axial direction A2. However, the invention is not limited thereto.

From the above, in the embodiments, the first through hole 1211 is extended, for example, along the second axial direction A2 that is approximately perpendicular to the first axial direction A1. The second through hole 1212 is extended, for example, along the first axial direction A1 that is approximately perpendicular to the second axial direction A2. In this way, in the embodiment, when the first movable guiding member 1241 moves in the first axial direction A1, with the configuration that the second through hole 1212 for the second guiding column 1252 is extended along the first axial direction A1, the second guiding column 1252 and the plate 121 are prevented from interfering with each other. Similarly, when the second movable guiding member 1251 moves in the second axial direction A2, with the configuration that the first through hole 1211 for the first guiding column 1242 is extended along the second axial direction A2, the first guiding column 1242 and the plate 121 are prevented from interfering with each other.

As shown in FIG. 2 to FIG. 6B, the lens module 12 of the embodiment further includes at least one first guide rail 126, at least one second guide rail 127, at least one first sliding groove 129, and at least one second sliding groove 130. In the embodiment, the first guide rail 126 and the second guide rail 127 are, for example, fixed to the light engine housing 111. The first sliding groove 129 and the second sliding groove 130 are, for example, disposed at the first position adjustment device 124 and the second position adjustment device 125, respectively. However, the invention is not limited thereto. In detail, in the embodiment, the first guide rail 126 is disposed between the light engine housing 111 and the first movable guiding member 1241. The second guide rail 127 is disposed between the light engine housing 111 and the second movable guiding member 1251. In the embodiment, the first sliding groove 129 is disposed at the first movable guiding member 1241 and movably disposed at the first guide rail 126. The second sliding groove 130 is disposed at the second movable guiding member 1251 and movably disposed at the second guide rail 127. In the embodiment, the first movable guiding member 1241 can be configured to move between the light engine housing 111 and the plate 121 by moving the first sliding groove 129 on the first guide rail 126. In the embodiment, the second movable guiding member 1251 can be configured to move between the light engine housing 111 and the plate 121 by moving the second sliding groove 130 on the second guide rail 127.

Specifically, in the embodiment, the first guide rail 126 is disposed on the light engine housing 111 and is extended along the first axial direction A1. The first sliding groove 129 is extended along the first axial direction A1 and is matched with the first guide rail 126. The second guide rail 127 is disposed on the light engine housing 111 and is extended along the second axial direction A2. The second sliding groove 130 is extended along the second axial direction A2 and is matched with the second guide rail 127. In the embodiment, when the first movable guiding member 1241 is driven by the first adjustment member 1243, the first movable guiding member 1241 can move in the first axial direction A1 along the first guide rail 126 via the first sliding groove 129. In the embodiment, when the second movable guiding member 1251 is driven by the second adjustment member 1253, the second movable guiding member 1251 can move in the second axial direction A2 along the second guide rail 127 via the second sliding groove 130. In the embodiment, Teflon glue may be applied between the first guide rail 126 and the first sliding groove 129. Teflon glue may also be applied between the second guide rail 127 and the second sliding groove 130. Thus, the lubricating effect between the first guide rail 126 and the first sliding groove 129, and that between the second guide rail 127 and the second sliding groove 130 can be improved. The friction during the adjustment process is thereby reduced, so as to achieve the effect of effort-saving.

However, the positions of the first guide rail 126, the second guide rail 127, the first sliding groove 129, and the second sliding groove 130 are described as examples. In other embodiments, the first guide rail 126 and the second guide rail 127 may be fixed to the first position adjustment device 124 and the second position adjustment device 125, respectively, and the first sliding groove 129 and the second sliding groove 130 may be disposed at the light engine housing 111 correspondingly. However, the invention is not limited thereto. In addition, in the embodiment, the number of the first through holes 1211 and the number of the second through holes 1212 of the plate 121 are, for example, two, respectively. The first through holes 1211 are arranged in the second axial direction A2. The second through holes 1212 are arranged in the first axial direction A1. In the embodiment, the number of the first guiding columns 1242 of the first position adjustment device 124 and the number of the second guiding columns 1252 of the second position adjustment device 125 are, for example, two, respectively. The first guiding columns 1242 pass through the various first through holes 1211. The second guiding columns 1252 pass through the various second through holes 1212. In addition, in the embodiment, there may be, for example, two first guide rails 126, two second guide rails 127, two first sliding grooves 129, and two second sliding grooves 130. However, the invention does not limit the numbers of the first through hole, the second through hole, the first guiding column, the second guiding column, the first guide rail, the second guide rail, the first sliding groove, and the second sliding groove. The numbers may be increased or decreased as actually required.

As shown in FIG. 2 to FIG. 6B, in the embodiments, the first movable guiding member 1241 of the first position adjustment device 124 has a first surface S1 facing the plate 121 and a second surface S2 facing the light engine housing 111. The first position adjustment device 124 further includes at least one first position-limiting column 1245. In the embodiment, the second movable guiding member 1251 of the second position adjustment device 125 has a third surface S3 facing the plate 121 and a fourth surface S4 facing the light engine housing 111. The second position adjustment device 125 further includes at least one second position-limiting column 1255. In the embodiment, the light engine housing 111 has at least one first position-limiting hole 1111 extended along the first axial direction A1 and at least one second position-limiting hole 1112 extended along the second axial direction A2. In the embodiment, the numbers of the first position-limiting column 1245, the second position-limiting column 1255, the first position-limiting hole 1111, and the second position-limiting hole 1112 are taken two as examples, respectively. However, the invention does not limit the numbers of the first position-limiting column, the second position-limiting column, the first position-limiting hole, and the second position-limiting hole. In the embodiment, the first guiding columns 1242 are disposed at the first surface S1 of the first movable guiding member 1241. The first position-limiting columns 1245 are disposed at the second surface S2 of the first movable guiding member 1241 and pass through the various first position-limiting holes 1111, respectively. In the embodiment, the second guiding columns 1252 are disposed at the third surface S3 of the second movable guiding member 1251. The second position-limiting columns 1255 are disposed at the fourth surface S4 of the second movable guiding member 1251 and pass through the various second position-limiting holes 1112, respectively.

As shown in FIG. 2 to FIG. 6B, in the embodiments, a length extended by each of the first position-limiting holes 1111 of the light engine housing 111 along the first axial direction A1 is, for example, less than a length extended by the second through hole 1212 of the plate 121 along the first axial direction A1. A length extended by each of the second position-limiting holes 1112 of the light engine housing 111 along the second axial direction A2 is, for example, less than a length extended by the first through hole 1211 along the second axial direction A2. However, the invention is not limited thereto. The main purpose of such a structural design is that the plate 121 of the lens module 12 can be moved in an appropriate range along both the first axial direction A1 and the second axial direction A2, such that the tilting of the plate 121 which would be resulted in the case that the guiding columns 1242 (the first guiding column) and 1252 (the second guiding column) penetrate the through holes 1211 (the first through hole) and 1212 (the second through hole) by directly abutting against the inner walls of these holes is avoided. For example, in the embodiment, when the plate 121 moves in the first axial direction A1, since the length extended by the first position-limiting holes 1111 along the first axial direction A1 is less than the length extended by the second through holes 1212 along the first axial direction A1, the first position-limiting columns 1245 can stop the plate 121 from moving by first abutting against an inner wall of a corresponding first position-limiting hole 1111, so that the second guiding column 1252 may be avoided from pushing the inner wall of the second through hole 1212. Similarly, in the embodiment, when the plate 121 moves in the second axial direction A2, since the length extended by the second position-limiting holes 1112 along the second axial direction A2 is less than the length extended by the first through holes 1211 along the second axial direction A2, the second position-limiting columns 1255 can stop the plate 121 from moving by first abutting against the inner wall of a corresponding second position-limiting hole 1112, so that the first guiding column 1242 can be avoided from pushing the inner wall of the first through hole 1211.

As shown in FIG. 2 to FIG. 5, in the embodiments, the lens module 12 of the projector 1 further includes a plurality of fixing members 128 and a plurality of elastic members 131. The plate 121 further has a plurality of via holes 1213. The light engine housing 111 has a plurality of fixing holes 1110. In the embodiment, these via holes 1213 are positioned to correspond to the fixing holes 1110, respectively. The fixing members 128 are fixed to the corresponding fixing holes 1110 via the corresponding via holes 1213, respectively. The elastic members 131 are respectively abutted against between a corresponding fixing member 128 and a corresponding fixing hole 1110. In detail, in the embodiment, the elastic members 131 are abutted onto the plate 121 via a washer 132, respectively. When the fixing members 128 are fixed into the corresponding fixing holes 1110 via the corresponding via holes 1213 respectively, the elastic members 131 are pressed by the fixing members 128 and an elastic thrust force is generated by the elastic members 131 as a result. The plate 121 is pushed toward the light engine housing 111 by the elastic thrust force generated by the elastic members 131, so that the plate 121 is brought into contact with the sliding member 1231 of the sliding component 123 and is movably disposed on the light engine housing 111. In the embodiment, since the plate 121 is pushed toward the light engine housing 111 by the elastic thrust force of the elastic members 131, when the fixing members 128 are fixed to the corresponding fixing holes 1110 respectively, a spacing between the plate 121 and the light engine housing 111 can be further adjusted by the elastic thrust force of the elastic members 131, such that the spacing is maintain to be a desired spacing. In the embodiment, the elastic member 131 is, for example, a spring. The washer 132 is, for example, a metal washer. Teflon, a Teflon washer or a plastic film, for example, may be disposed between the washer 132 and the plate 121 to achieve the effects of lubrication and/or moisture proofing, etc. However, the invention is not limited thereto.

Figure 7:
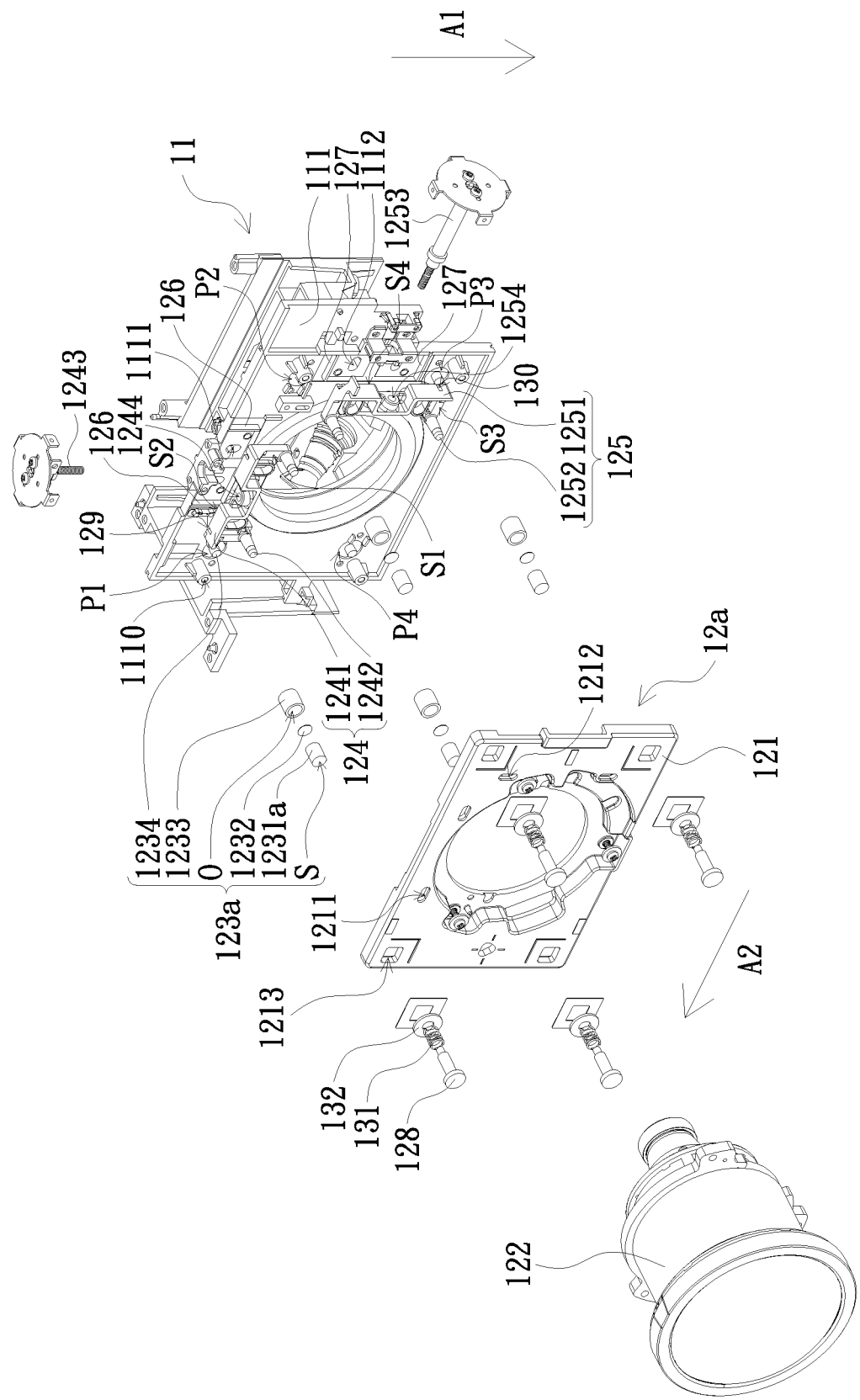
FIG. 7 is a schematically exploded view of a light engine module and a lens module of another embodiment of the invention.

FIG. 7 is a schematically exploded view of a light engine module and a lens module of another embodiment of the invention. As shown in FIG. 7, a lens module 12*a* of the embodiment is similar to the lens module 12 shown in FIG. 2. The difference mainly lies in that sliding members 1231*a* of a sliding component 123*a* of the embodiment are cylindroids in shape. In the embodiment, the cylindroids (the sliding members 1231*a*) are extended in a direction from the light engine housing 111 toward the plate 121. Each of the cylindroids (the sliding members 1231*a*) has a sliding surface S facing the plate 121. The sliding surface S of the cylindroid (the sliding member 1231*a*) is in contact with the plate 121, so that the plate 121 can move relative to the light engine housing 111 via the sliding members 1231*a*. In the embodiment, the sliding surface S is, for example, a flat surface, but the invention is not limited thereto. In other embodiments, the sliding surface S may be a surface having an arcuated profile or a surface having other suitable shapes, but the invention is not limited thereto. In addition, in the embodiment, the base 1233 of the sliding component 123*a* is, for example, separated from the light engine housing 111, but the invention is not limited thereto. However, in an embodiment, the base 1233 of the sliding component 123*a* is directly connected to the light engine housing 111. In other embodiments, the base 1233 of the sliding component 123*a* and the light engine housing 111 are, for example, integrally formed in structure, but the invention is not limited thereto.

Figure 8:
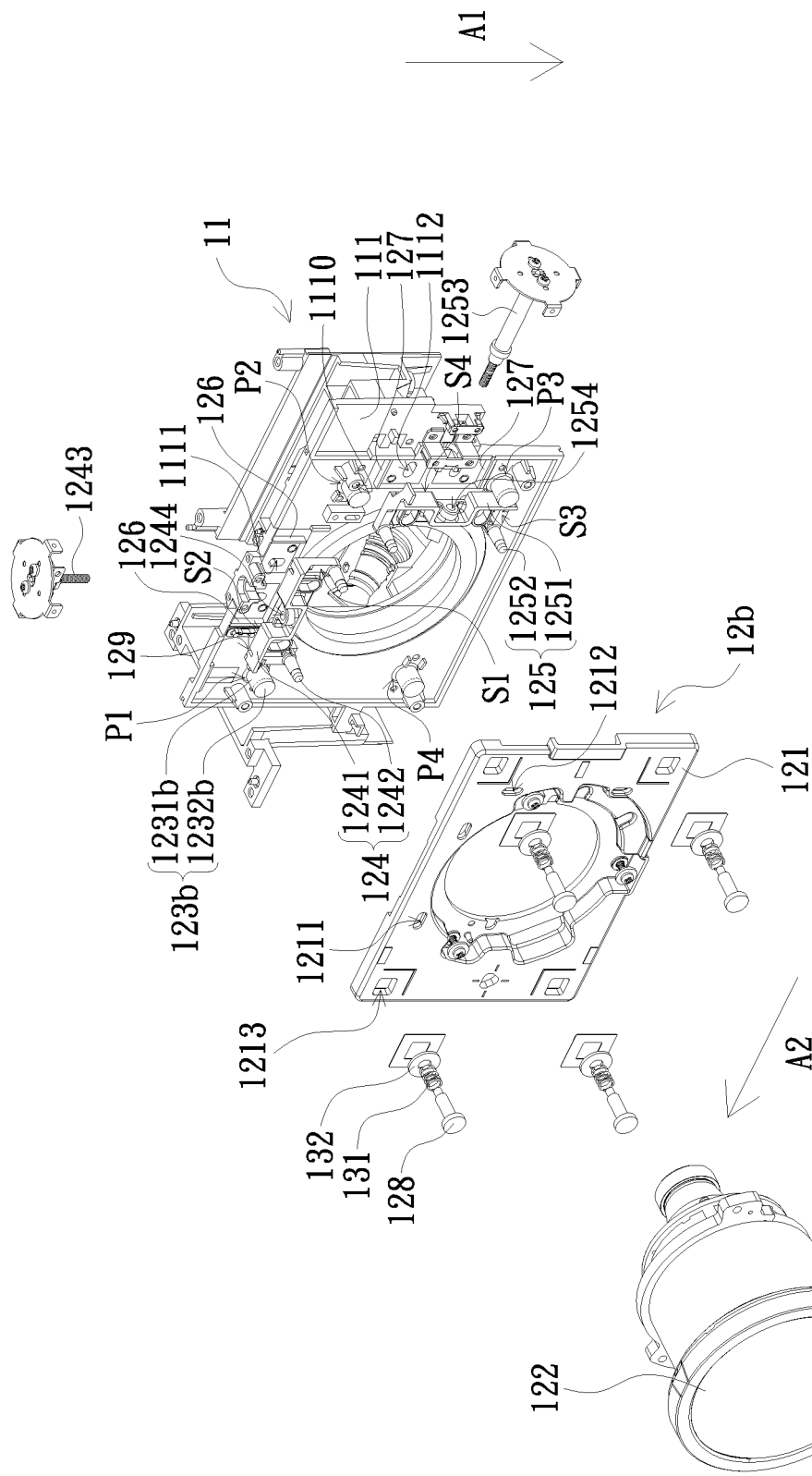
FIG. 8 is a schematically exploded view of a light engine module and a lens module of another embodiment of the invention.

FIG. 8 is a schematically exploded view of a light engine module and a lens module of another embodiment of the invention. As shown in FIG. 8, a lens module 12*b* of the embodiment is similar to the lens module 12 shown in FIG. 2. The difference mainly lies in that sliding members 1231*b* of a sliding component 123*b* and the corresponding distance adjustment members 1232*b* of the embodiment are integrally formed cylindroids. The sliding member 1231*b* of the embodiment is located between the light engine housing 111 and a corresponding distance adjustment member 1232*b*. In the embodiment, the distance adjustment member 1232*b* is located between the plate 121 and a corresponding sliding member 1231*b*. In addition, in the embodiment, the base 1233 and the boss 1234 shown in FIG. 2 are omitted from the sliding component 123*b*.

In summary, in the projector of the embodiment of the invention, the lens module can be moved in at least two directions (for example, a horizontal direction and/or a vertical direction) via the position adjustment device. The distance between the light engine housing and the plate is adjusted via the distance adjustment members of the sliding components, so that the light engine housing and the plate do not incline to each other, and the positional relationship between the lens fixed onto the plate and the light valve located in the light engine housing is thereby well controlled to improve movement accuracy and imaging stability of the lens module, so as to ensure that the projected screen is not blurred when the lens module moves. The imaging resolution of the lens module, when moving, is thereby enhanced. In addition, in the embodiment of the invention, since the sliding component is disposed between the light engine housing and the plate, there is no direct contact between the plate and the light engine housing. As a result, when the lens module moves, the plate of the lens module and the light engine housing may not be damaged due to friction. The lens module in the embodiment of the invention can be applied to a short focus projector.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first position adjustment device, the second position adjustment device, the first guide rail, the second guide rail, the first sliding groove, the second sliding groove, the first position-limiting hole, the second position-limiting hole, the first through hole, the second through hole, the first movable guiding member, the second movable guiding member, the first guiding column, the second guiding column, the first adjustment member, the second adjustment member, the first position-limiting column, the second position-limiting column, the first axial direction, the second axial direction, the first position, the second position, the third position, the fourth position, the first surface, the second surface, the third surface, and the fourth surface are only used for distinguishing various elements and do not limit the number of the elements.

What is claimed is:

1. A projector, comprising:
   a light source, providing an illumination beam;
   a light engine module, comprising:
      a light engine housing; and
      a light valve, accommodated in the light engine housing and used to convert the illumination beam into an image beam; and
   a lens module, located on a transmission path of the image beam and comprising:
      a plate;
      a lens, fixed to the plate, wherein the image beam becomes a projection beam after passing through the lens;
      at least two sliding components, disposed between the plate and the light engine housing, and at least located respectively at a first position and a second position of the light engine housing, wherein each of the at least two sliding components has a sliding member and a distance adjustment member, the plate is movably disposed on the light engine housing via the sliding members, and the distance adjustment members are in contact with the sliding members respectively, so that a distance between the first position and the lens module is equal to a distance between the second position and the lens module; and
      a first position adjustment device, movably disposed between the plate and the light engine housing, and configured to move in a first axial direction when applied a force, so as to drive the plate to move on the at least two sliding components in the first axial direction and with respect to the light engine housing,
      wherein each of the at least two sliding components further comprises:
         a base, disposed between the plate and the light engine housing, and having an opening facing the plate, wherein the distance adjustment member is located in the base, and the sliding member is disposed at the base such that a part of the sliding member extends out of the opening; and
         a boss, disposed in the base, wherein the distance adjustment member is located between the boss and the sliding member.

2. The projector according to claim 1, wherein a distance between the first position and the plate is equal to a distance between the second position and the plate.

3. The projector according to claim 1, wherein each of the distance adjustment members is located between the light engine housing and a corresponding one of the sliding members.

4. The projector according to claim 1, wherein each of the sliding members is a spheroid or a cylindroid.

5. The projector according to claim 1, wherein each of the sliding members and a corresponding one of the distance adjustment members are integrally formed to be a cylindroid and each of the sliding members is located between the light engine housing and the corresponding one of the distance adjustment members.

6. The projector according to claim 1, wherein each of the distance adjustment members is extended from the light engine housing toward the plate and has a thickness, and the thicknesses of the distance adjustment members are different from or the same as each other.

7. The projector according to claim 1, wherein the plate has at least one first through hole, and the first position adjustment device comprises:
   a first movable guiding member, movably disposed between the plate and the light engine housing; and
   at least one first guiding column, disposed at the first movable guiding member and passing through the at least one first through hole, wherein the first movable guiding member is configured to move in the first axial direction when applied a force, so that the first guiding column drives the plate to move on the at least two sliding components in the first axial direction and with respect to the light engine housing.

8. The projector according to claim 7, wherein the first position adjustment device further comprises a first adjustment member, and the first adjustment member is coupled to the first movable guiding member and drives the first movable guiding member to move in the first axial direction, so that the first guiding column drives the plate to move on the at least two sliding components in the first axial direction.

9. The projector according to claim 7, wherein the at least one first through hole is extended along a second axial direction, the plate further has at least one second through hole, the at least one second through hole is extended along the first axial direction, and the first axial direction is perpendicular to the second axial direction.

10. The projector according to claim 9, wherein the lens module further comprises a second position adjustment device and the second position adjustment device comprises:
   a second movable guiding member, movably disposed between the plate and the light engine housing; and
   at least one second guiding column, disposed at the second movable guiding member and passing through the at least one second through hole, wherein the second movable guiding member is configured to move in the second axial direction when applied a force, so that the second guiding column drives the plate to move on the at least two sliding components in the second axial direction and with respect to the light engine housing.

11. The projector according to claim 10, wherein the second position adjustment device further comprises a second adjustment member, and the second adjustment member is coupled to the second movable guiding member and drives the second movable guiding member to move in the second axial direction, so that the second guiding column drives the plate to move on the at least two sliding components in the second axial direction.

12. The projector according to claim 10, wherein the lens module further comprises at least one first guide rail, at least one second guide rail, at least one first sliding groove and at least one second sliding groove, wherein the at least one first guide rail is disposed between the light engine housing and the first movable guiding member, the at least one second guide rail is disposed between the light engine housing and the second movable guiding member, the at least one first sliding groove is disposed at the first movable guiding member and movably disposed at the at least one first guide rail, and the at least one second sliding groove is disposed at the second movable guiding member and movably disposed at the at least one second guide rail, so that the first movable guiding member is configured to move between the light engine housing and the plate by moving the at least one first sliding groove on the at least one first guide rail and the second movable guiding member is configured to move between the light engine housing and the plate by moving the at least one second sliding groove on the at least one second guide rail.

13. The projector according to claim 11, wherein the first movable guiding member has a first surface facing the plate and a second surface facing the light engine housing, the second movable guiding member has a third surface facing the plate and a fourth surface facing the light engine housing, the first position adjustment device further comprises at least one first position-limiting column, the second position adjustment device further comprises at least one second position-limiting column, the light engine housing has at least one first position-limiting hole extended along the first axial direction and at least one second position-limiting hole extended along the second axial direction, the first guiding column is disposed at the first surface, the first position-limiting column is disposed at the second surface and passes through the at least one first position-limiting hole, the second guiding column is disposed at the third surface, and the second position-limiting column is disposed at the fourth surface and passes through the at least one second position-limiting hole.

14. The projector according to claim 13, wherein a length extended by the at least one first position-limiting hole along the first axial direction is less than a length extended by the at least one second through hole along the first axial direction, and wherein a length extended by the at least one second position-limiting hole along the second axial direction is less than a length extended by the at least one first through hole along the second axial direction.

15. The projector according to claim 1, wherein the lens module further comprises a plurality of fixing members and a plurality of elastic members, the plate further has a plurality of via holes, the light engine housing has a plurality of fixing holes, the via holes are positioned to correspond to the fixing holes respectively, each of the plurality of fixing members passes through one of the plurality of via holes and is fixed into a corresponding one of the plurality of the fixing holes, and each of the plurality of elastic members is abutted against between one of the plurality of fixing members and a corresponding one of the plurality of fixing holes, so that the plate is movably disposed on the light engine housing by contacting the at least two sliding components.

16. A lens module for a projector, wherein the lens module comprises:
a plate;
a lens, fixed to the plate;
at least two sliding components, disposed between the plate and a light engine housing of the projector, and at least located respectively at a first position and a second position of the light engine housing, wherein each of the at least two sliding components has a sliding member and a distance adjustment member, the plate is movably disposed on the light engine housing via the sliding members, and the distance adjustment members are in contact with the sliding members respectively, so that a distance between the first position and the lens module is equal to a distance between the second position and the lens module; and
a first position adjustment device, movably disposed between the plate and the light engine housing and used to move in a first axial direction when applied a force, so as to drive the plate to move on the at least two sliding components in the first axial direction and with respect to the light engine housing,
wherein each of the at least two sliding components further comprises:
a base, disposed between the plate and the light engine housing, and having an opening facing the plate, wherein the distance adjustment member is located in the base, and the sliding member is disposed at the base such that a part of the sliding member extends out of the opening; and
a boss, disposed in the base, wherein the distance adjustment member is located between the boss and the sliding member.

17. The lens module according to claim 16, wherein a distance between the first position and the plate is equal to a distance between the second position and the plate.

18. The lens module according to claim 16, wherein each of the distance adjustment members is located between the light engine housing and a corresponding one of the sliding members.

19. The lens module according to claim 16, wherein each of the sliding members is a spheroid or a cylindroid.

20. The lens module according to claim 16, wherein each of the sliding members and a corresponding one of the distance adjustment members are integrally formed to be a cylindroid and each of the sliding members is located between the light engine housing and the corresponding one of the distance adjustment members.

21. The lens module according to claim 16, wherein each of the distance adjustment members is extended from the light engine housing toward the plate and has a thickness, and the thicknesses of the distance adjustment members are different from or the same as each other.

22. The lens module according to claim 16, wherein the plate has at least one first through hole, and the first position adjustment device comprises:
a first movable guiding member, movably disposed between the plate and the light engine housing; and
at least one first guiding column, disposed at the first movable guiding member and passing through the at least one first through hole, wherein the first movable guiding member is configured to move in the first axial direction when applied a force, so that the first guiding column drives the plate to move on the at least two sliding components in the first axial direction and with respect to the light engine housing.

23. The lens module according to claim 22, wherein the first position adjustment device further comprises a first adjustment member, and the first adjustment member is coupled to the first movable guiding member and drives the first movable guiding member to move in the first axial direction, so that the first guiding column drives the plate to move on the at least two sliding components in the first axial direction.

24. The lens module according to claim 22, wherein the at least one first through hole is extended along a second axial direction, the plate further has at least one second through hole, the at least one second through hole is extended along the first axial direction, and the first axial direction is perpendicular to the second axial direction.

25. The lens module according to claim 24, further comprising a second position adjustment device, wherein the second position adjustment device comprises:
a second movable guiding member, movably disposed between the plate and the light engine housing; and
at least one second guiding column, disposed at the second movable guiding member and passing through the at least one second through hole, wherein the second movable guiding member is configured to move in the second axial direction when applied a force, so that the second guiding column drives the plate to move on the at least two sliding components in the second axial direction and with respect to the light engine housing.

26. The lens module according to claim 25, wherein the second position adjustment device further comprises a second adjustment member, and the second adjustment member is coupled to the second movable guiding member and drives the second movable guiding member to move in the second axial direction, so that the second guiding column drives the plate to move on the at least two sliding components in the second axial direction.

27. The lens module according to claim 25, further comprising at least one first guide rail, at least one second guide rail, at least one first sliding groove and at least one second sliding groove, wherein the at least one first guide rail is disposed between the light engine housing and the first movable guiding member, the at least one second guide rail is disposed between the light engine housing and the second movable guiding member, the at least one first sliding groove is disposed at the first movable guiding member and movably disposed at the at least one first guide rail, and the at least one second sliding groove is disposed at the second movable guiding member and movably disposed at the at least one second guide rail, so that the first movable guiding member is configured to move between the light engine housing and the plate by moving the at least one first sliding groove on the at least one first guide rail and the second movable guiding member is configured to move between the light engine housing and the plate by moving the at least one second sliding groove on the at least one second guide rail.

28. The lens module according to claim 25, wherein the first movable guiding member has a first surface facing the plate and a second surface facing the light engine housing, the second movable guiding member has a third surface facing the plate and a fourth surface facing the light engine housing, the first position adjustment device further comprises at least one first position-limiting column, the second position adjustment device further comprises at least one second position-limiting column, the light engine housing has at least one first position-limiting hole extended along the first axial direction and at least one second position-limiting hole extended along the second axial direction, the first guiding column is disposed at the first surface, the first position-limiting column is disposed at the second surface and passes through the at least one first position-limiting hole, the second guiding column is disposed at the third surface, and the second position-limiting column is disposed at the fourth surface and passes through the at least one second position-limiting hole.

29. The lens module according to claim 28, wherein a length extended by the at least one first position-limiting hole is extended along the first axial direction is less than a length extended by the at least one second through hole is extended along the first axial direction, and wherein a length extended by the at least one second position-limiting hole along the second axial direction is less than a length extended by the at least one first through hole along the second axial direction.

30. The lens module according to claim 16, further comprising a plurality of fixing members and a plurality of elastic members, wherein the plate further has a plurality of via holes, the light engine housing has a plurality of fixing holes, the via holes are positioned to correspond to the fixing holes respectively, each of the plurality of fixing members passes through one of the plurality of via holes and is fixed into a corresponding one of the plurality of the fixing holes, and each of the plurality of elastic members is abutted against between one of the plurality of fixing members and a corresponding one of the plurality of fixing holes, so that the plate is movably disposed on the light engine housing by contacting the at least two sliding components.

* * * * *